United States Patent [19]
Hardwick et al.

[11] 3,769,997
[45] Nov. 6, 1973

[54] CONTROL VALVE

[75] Inventors: David R. Hardwick, Maryland Hgts.; Raymond F. Stelzer, Bel Nor, both of Md.

[73] Assignee: Wagner Electric Corporation, Newark, N.J.

[22] Filed: July 3, 1972

[21] Appl. No.: 268,927

[52] U.S. Cl. .............................. 137/102, 303/6 C
[51] Int. Cl. ......................................... F16k 17/10
[58] Field of Search ..................... 137/102; 303/6 C

[56] References Cited
UNITED STATES PATENTS

| 3,510,172 | 5/1970 | Pekrul | 137/102 X |
| 3,492,052 | 1/1970 | Klimek | 137/102 X |
| 2,488,949 | 11/1949 | Walsh | 137/102 X |
| 3,190,700 | 6/1965 | Fites | 137/102 X |
| 3,473,849 | 10/1969 | Smith | 303/6 C |
| 3,232,057 | 2/1966 | Kersting | 303/6 C X |

Primary Examiner—Harold W. Weakley
Attorney—James R. Bell

[57] ABSTRACT

A control valve for varying fluid pressure applied to the front brakes is provided with a proportioning member including a resiliently urged member caged therewith for concerted and relative movement.

16 Claims, 4 Drawing Figures

PATENTED NOV 6 1973　　　　　　　　3,769,997

CONTROL VALVE

FIELD OF THE INVENTION

This invention relates generally to brake systems for vehicles and in particular to control valves for predeterminately varying fluid pressure applied to the vehicle front brakes.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious effect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principle object of the present invention is to provide a control valve for use in a vehicle brake system which overcomes the aforementioned disadvantageous or undesirable features, and this, as well as other objects and advantageous features of the present invention, will become apparent from the specification which follows.

SUMMARY OF THE INVENTION

Briefly, the present invention comprises a control valve having modulating means including resiliently urged means caged therewith concertedly and relatively movable in response to supplied fluid pressures less than first and second predetermined values to effect applied fluid pressures in first and second predetermined ratios, respectively, said resiliently urged means being relatively movable to a disabled position in response to the applied fluid pressure of the second predetermined value and said modulating means thereafter overcoming the force of said resiliently urged means applied thereto to blend the supplied and applied fluid pressures.

RELATED PATENTS

This patent application is related to U.S. Pat. No. 3,492,052 and 3,653,722 respectively issued on Jan. 27, 1970 and Apr. 4, 1972 to B. Klimek, but this patent application is a patentably distinct improvement.

DETAILED DESCRIPTION OF THE INVENTION

Figure 1:
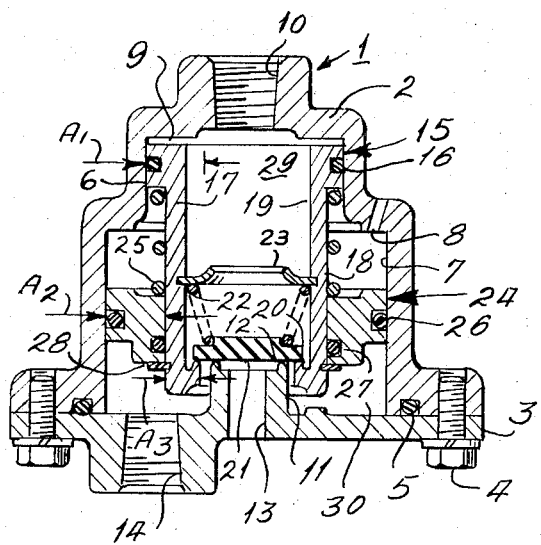
FIG. 1 is a sectional view of a control valve illustrating a preferred embodiment of the present invention in cross-section.

Referring now to the drawings in detail and in particular to FIG. 1, a control valve 1 is provided with upper and lower housing portions 2, 3 which are interconnected by suitable means, such as a plurality of studs or screws 4, and said housing portions have suitable sealing means 5 interposed therebetween. The upper housing 2 is provided with a bore and counterbore 6, 7 having an annular shoulder or abutment 8 interposed therebetween, said bore defining an end wall 9 on said upper housing intersected by an inlet or supply port 10 adapted for connection with a fluid pressure supply, such as an application or foot valve well-known in the art (not shown). The lower housing or end plate 3 is provided with a centrally located extension 11 which extends coaxially into the upper housing counterbore 7 defining an exhaust valve seat 12 on the upper or free end thereof, and an exhaust passage or port 13 is provided in said lower housing extending coaxially through said extension and exhaust valve seat. An outlet port 14 is also provided in the lower housing 3 in pressure fluid communication with the counterbore 7 and adapted for connection with the vehicle front brakes (not shown).

Application, proportioning or modulating means, such as the piston indicated generally at 15, is slidably received in the housing bore 6 having a peripheral seal 16 in sealing engagement with said housing bore, and a cylindrical extension 17 having a generally cylindrical peripheral surface 18 is integrally provided on the piston 15 extending coaxially into the housing counterbore 7. A stepped passage 19 having a valve seat 20 therein is axially provided through the proportioning piston 15 and is coaxial with the lower housing extension 11. AA valve member 21 is normally urged toward sealing engagement with the stepped passage valve seat 20 and the exhaust valve seat 12 by one end of a valve spring 22 of negligible compressive force while the other end thereof is contained by a split ring type retainer 23 positioned against displacement in the larger of the stepped passages 19.

Resiliently urged means, such as the annular reaction piston indicated generally at 24, is slidably received in the housing counterbore 7 and on the peripheral surface 18 of the proportioning piston extension 17 in concentric arrangement therewith, and a spring 25 is biased in caged relation between the pistons 15, 24, said piston 24 containing seals 26, 27 in sealing engagement with the housing counterbore 7 and the peripheral surface 18 of the piston 15. A snap ring and groove assembly 28 is provided in the peripheral surface 18 of the piston extension 17 adjacent to the lower end thereof to contain or cage the compressive force of the piston spring 25 between the pistons 15, 24.

An expansible inlet chamber 29 is provided in the housing bore 6 and the larger stepped passage 19 of the piston 15 between the housing shoulder 9 and the sealing engagement of the valve member 21 with the piston valve seat 20, and said inlet chamber is connected in open pressure fluid communication with the inlet port 10 at all times. An expansible outlet chamber 30 which is connected in open pressure fluid communication with the outlet port 14 is provided in the housing counterbore 7 between the housing end plate 3 and the lower ends of the pistons 15, 24, and the sealing engagement of the valve member 21 with the exhaust valve and piston seats 12, 20 controls pressure fluid communication between said outlet chamber and the exhaust port 13 and inlet chamber 29, respectively.

An annular effective input area $A_1$ is provided on the proportioning piston 15 between the sealing engagements of the seal 16 with the housing bore 6 and the valve member 21 with the proportioning piston valve seat 20, said area $A_1$ being subjected to the fluid pressure at the inlet port 10. An annular effective area $A_2$ is provided on the piston 24 between the respective sealing engagements of the seals 26, 27 thereof with the housing counterbore 7 and the proportioning piston peripheral surface 18, said area $A_2$ being subjected to the fluid pressure at the outlet port 14. The proportioning piston 15 is also provided with annular effective output area $A_3$ generally defined between the sealing engagement of the seal 27 with the proportioning piston peripheral surface 18 and the sealing engagement of the valve member 21 with the exhaust valve seat 12, and the area $A_3$ is opposed to and predeterminately less than the area $A_1$ being subjected to the fluid pressure at the outlet port 14.

In the operation with the component parts of the control valve 1 in their inoperative positions as shown in FIG. 1 and as described hereinabove, a supplied or input fluid pressure P at the inlet port 10 flows into the inlet chamber 29 acting on the input area $A_1$ of the piston 15 to establish an input force P $A_1$ urging said piston downwardly in the housing bore and counterbore 6, 7 against only the negligible compressive force of the valve spring 22, and since the piston 24 is urged into caged relation or abutment with the piston 15 by the spring 25, the piston 24 is concertedly movable with the piston 15 in response to the input force P $A_1$. The concerted downward movement of the pistons 15, 24 disengages the piston valve seat 20 from the valve member 21 which is sealably engaged with the exhaust valve seat 12 to establish metered pressure fluid communication between the inlet and outlet ports 10, 14 and a reduced applied or output fluid pressure Po at said outlet port which acts on the additive areas $A_2$, $A_3$ of the pistons 15, 24 creating an output force Po ($A_2$ + $A_3$). When the output force Po ($A_2$ + $A_3$) attains a value balancing that of the opposed input force P $A_1$, the pistons 15, 24 are concertedly moved upwardly in the housing bore and counterbore 6, 7 to reengage the piston valve seat 20 in lapped relation with the valve member 21. From the graphical representation in FIG. 2, it is obvious that increases in the input fluid pressure P less than the predetermined value M, as shown by the line OM, will result in proportionally reduced increases in the output fluid pressure Po, as shown by the line OR, in a predetermined ratio with the input fluid pressure P wherein: Po = P $A_1/A_2 + A_3$.

Figure 2:
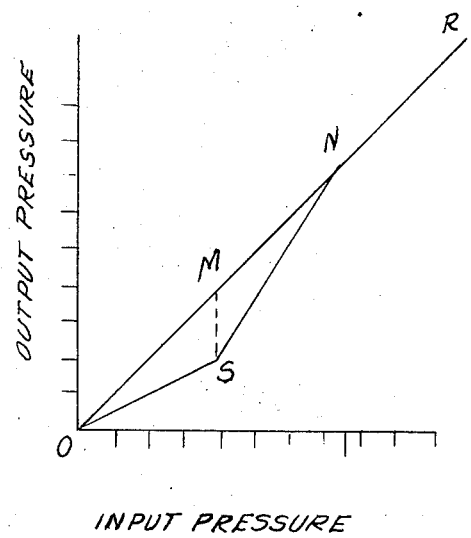
FIG. 2 is a graphical representation illustrating the applied or output fluid pressures effected by the control valve of FIG. 1 in response to the supplied or input fluid pressures acting thereon.

When the input fluid pressure P at the inlet port 10 is increased to a value in excess of the predetermined value M but less than the predetermined value N, as shown on the line MN in the graph of FIG. 2, the input force P $A_1$ actuates the piston 15 to disengage the piston valve seal 20 from the valve member 21 to again effect a metered increase in the output fluid pressure Po at the outlet port 14 to a value in excess of the predetermined value S as shown by the line SN in the graph of FIG. 2. Upon the increase of the output fluid pressure Po to a value in excess of the predetermined value S but less than the predetermined value N, the force Po $A_2$ of the output fluid pressure Po acting on the area $A_2$ of the piston 24 overcomes the caged precompressed force Fs of the spring 25 wherein the piston 24 is moved upwardly relative to the piston 15 against the spring force Fs toward a position disengaged from the snap ring 28 on the piston 15. In this manner, the upward movement of the piston 24 relative to the piston 15 compresses the spring 25 to exert the force Fs thereof against the piston 15, and the piston 15 is further movable relative to the piston 24 in response to the input force P $A_1$ against the additive spring and output forces Fs, Po $A_3$ to disengage the piston valve seat 20 from the valve member 21 effecting a further increase in the output fluid pressure Po at the outlet port 14. The increased output fluid pressure Po at the outlet port 14 effects a corresponding increase in the output force Po $A_3$, and when the increased output force Po $A_3$ and the spring force Fs additive thereto again balance the increased input force P $A_1$, the piston 15 is moved upwardly to re-engage the piston valve seat 20 in lapped relation with the valve member 21. From the graph of FIG. 2, it is obvious that increases in the input fluid pressure P in excess of the predetermined value M but less than the predetermined value N, as shown by the line MN, will result in proportionally reduced increases in the output fluid pressure Po, as shown by the line SN, wherein: Po = P $A_1 - Fs/A_3$.

When the magnitudes of the input and output fluid pressures P, Po attain the predetermined value N, as shown in the graph of FIG. 2, the force Po $A_2$ acting on the piston 24 further urges said piston upwardly against the force Fs of the spring 25 toward a disabled position into abutting engagement with the housing abutment or stop 8. Thereafter, further increases in the input fluid pressure P in excess of the predetermined value N effects a corresponding increase in the input force P $A_1$ acting on the piston 15 which overcomes the opposing output force Po $A_3$ and the spring force Fs additive thereto to move the piston 15 downwardly relative to the piston 24 toward an open or non-proportioning position disengaging the piston valve seat 20 from the valve member 21 and establishing open pressure fluid communication between the inlet and outlet ports 10, 14 through the piston passage 19 thereby blending or equalizing the input and output fluid pressures P, Po.

When the desired braking effort has been attained by the actuation of the control valve 1 as described hereinbefore, the input fluid pressure P at the inlet port 10 is vented to atmosphere which eliminates the input force $P A_1$ acting on the piston 15, and thereafter the output force $Po A_3$ and the force Fs of the spring 25 urges the piston 15 upwardly relative to the piston 24 toward engagement with the housing shoulder 9. This upward movement of the piston 25 initially re-engages the piston valve seat 20 with the valve member 21 interrupting communication between the inlet and outlet ports 10, 14 and thereafter concertedly moves the valve member 21 toward a venting or exhausting position disengaged from the exhaust valve seat 12 and establishing exhausting pressure fluid communication between the outlet and exhaust ports 14, 13. The exhaustion of the output fluid pressure Po eliminates the output forces $Po A_3$, $Po A_2$ acting on the pistons 15, 24, and the spring 25 returns the piston 24 from its disabled position in engagement with the housing abutment 8 toward its caged position in abutting engagement with the snap ring 28 on the piston 24.

Figure 3:
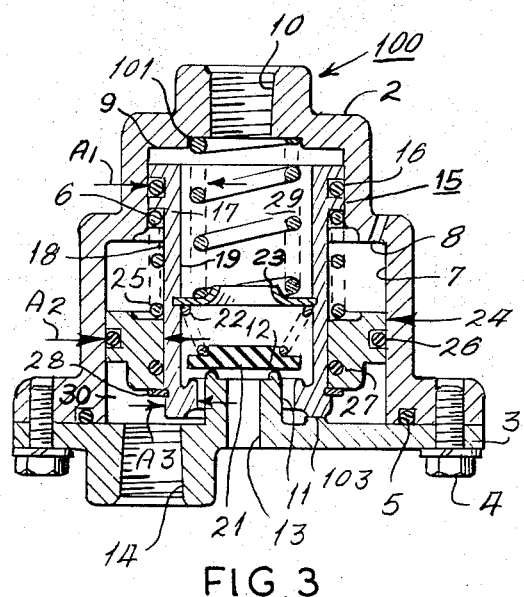
FIG. 3 is a sectional view of a control valve illustrating another preferred embodiment of the present invention.

Referring now to FIG. 3, another control valve 101 is shown having substantially the same component parts and functioning substantially in the same manner as the previously described control valve 1 with the following exceptions.

The control valve 100 is provided with a biasing spring 101 engaged between the housing shoulder 9 and the spring retainer 23 in the larger stepped passage 19 of the piston 15 and normally urging said piston toward an inoperative position engaging the lower end thereof with an abutment 103 provided on the lower housing 3 and disengaging the piston valve seat 20 from the valve member 21 to place the inlet and outlet ports 10, 14 in open pressure fluid communication through the piston stepped passage 19.

Figure 4:
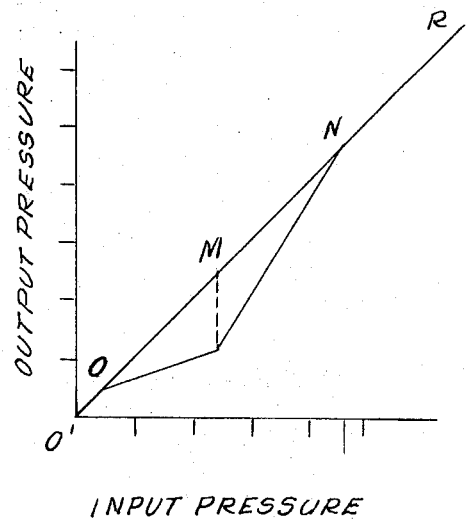
FIG. 4 is a graphical representation of the applied or output fluid pressures effected by the control valve of FIG. 3 in response to the supplied or input fluid pressures acting thereon.

In the operation with the component parts of the control valve 100 in their inoperative position as shown in FIG. 3, and as described hereinabove, the input or supplied fluid pressure P supplied to the inlet port 10 flows through the housing bore 6, the stepped bore 19 of the piston 15, into the housing counterbore 7 to establish the applied or output fluid pressure Po at the outlet port 14. The input fluid pressure acts on the input area $A_1$ to establish the input force $P A_1$ which is additive to the force Fc of the biasing spring 101, and the output fluid pressure Po acts on the additive effective areas $A_2$, $A_3$ of pistons 24, 15 to establish the output force Po ($A_3$ + $A_4$) which is opposed to the additive input and spring forces $P A_1$, Fc. When the input and output fluid pressures P, Po attain the value 0, as shown on the line 0'0 in the graph of FIG. 4, the output force $Po(A_2 + A_3)$ overcomes the additive input and spring forces $P A_2$, Fc concertedly urging the cased pistons 15, 24 upwardly to engage the piston valve seat 20 in lapped relation with the valve member 21 interrupting pressure fluid communication between the inlet and outlet ports 10, 14. When the piston valve seat and valve member 20, 21 are so engaged, the control valve 100 then functions in precisely the same manner as previously described with respect to the control valve 1.

From the foregoing, it is now apparent that control valves 1, 100 meeting the objects and advantageous features set forth hereinbefore, as well as others, are disclosed and that changes as to the precise configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing having inlet and outlet ports therein, proportioning valve means movable in said housing between said inlet and outlet ports for performing proportioning operations on fluid pressure communication between said inlet and outlet ports, said proportioning valve means including first and second opposed effective areas subjected to said fluid pressure to establish supplied and reduced applied fluid pressures respectively with said first and second areas, said first area being predeterminately greater than said second area, said proportioning valve means being generally operable in response to the supplied fluid pressure less than a first predetermined value to effect the application through said housing of the reduced applied fluid pressure in a first predetermined ratio with the supplied fluid pressure and also in response to the supplied fluid pressure in excess of the first predetermined value and less than a second predetermined value predeterminately greater than the first predetermined value to effect the reduced applied fluid pressure in a second predetermined ratio with the supplied fluid pressure, resiliently urged means connected in caged relation with said proportioning means for concerted and relative movement therewith in said housing and subjected to the reduced applied fluid pressure, said resiliently urged means being concertedly movable with said proportioning means when the reduced applied fluid pressure acting thereon is in the first predetermined ratio and being movable relative to said proportioning valve means to apply thereto the inherent force of said resiliently urged means when the reduced applied fluid pressure acting thereon is in the second predetermined ratio, and abutment means on said housing for engagement with said resiliently urged means to limit the relative movement thereof, said proportioning valve means being responsive to supplied fluid pressure in excess of the second predetermined value to overcome the inherent force of said resiliently urged means acting on said proportioning value means and blend the supplied and applied fluid pressures when said resiliently urged means is engaged with said abutment means.

2. A control valve according to claim 1, comprising a third effective area on said resiliently urged means subjected to the reduced applied fluid pressure and additive to said second area.

3. A control valve according to claim 2, wherein said third area is predeterminately greater than either of said first and second areas.

4. A control valve according to claim 1, comprising a third effective area on said resiliently urged means for subjection to the reduced applied fluid pressure, said third area being additive to said second area, the reduced applied fluid pressure in the second predetermined ratio acting on said third area to urge said resiliently urged means from its connection in caged relation with said proportioning valve means toward engagement with said abutment means wherein the inherent force of said resiliently urged means is applied to said proportioning valve means.

5. A control valve according to claim 1, comprising an effective area on said resiliently urged means subjected to the reduced applied fluid pressure, the reduced applied fluid pressure in the second predetermined ratio acting on said area urging said resiliently urged means from its connection in caged relation with said proportioning valve means toward engagement with said abutment means to apply the inherent force of said resiliently urged means onto said proportioning valve means to oppose the proportioning operation thereof.

6. A control valve according to claim 1, comprising other abutment means on said proportioning valve means, said resiliently urged means being normally urged toward engagement with said other abutment means defining the connection in caged relation with said proportioning valve means.

7. A control valve according to claim 6, wherein said resiliently urged means includes piston means concentric with said proportioning valve means, said area being on said piston means, and spring means engaged between said proportioning valve means and piston means urging said piston means toward engagement with said other abutment means.

8. A control valve according to claim 4, wherein said proportioning valve means includes piston means movable in said housing and concentric with said resiliently urged means, other abutment means on said piston means for engagement with said resiliently urged means, the inherent force of said resiliently urged means normally urging it toward engagement with said other abutment means defining the connection in caged relation with said piston means, said first and second areas being on said piston means.

9. A control valve according to claim 1, comprising resilient means engaged with said proportioning valve means and concertedly urging said proportioning valve means and resiliently urged means toward a position in said housing blending the supplied and applied fluid pressures until the magnitudes thereof attain another predetermined value predeterminately less than said first predetermined value, said proportioning valve means being thereafter responsive to supplied fluid pressures between said other and first predetermined values and between said first and second predetermined values to perform its proportioning operation.

10. A control valve comprising a housing having inlet and outlet ports therein, piston means movable in said housing between said inlet and outlet ports including valve means for controlling pressure fluid communication between said inlet and outlet ports, said piston means being responsive to fluid pressure at said inlet port less than a predetermined value to actuate said valve means and establish fluid pressure at said outlet port in a predetermined ratio with that at said inlet port and said piston means also being responsive to fluid pressure at said inlet port less than another predetermined value predeterminately greater than said first named predetermined value to actuate said valve means and establish fluid pressure at said outlet port in another predetermined ratio with that at said inlet port, other piston means concentric with said first named piston means for concerted and relative movement therewith in said housing and subjected only to the fluid pressure at said outlet port, first abutment means on said first named piston means for engagement with said other piston means, resilient means connected in caged relation between said first named and other piston means and urging said other piston means toward engagement with said first abutment means, said other piston means being concertedly movable with said first named piston means when the fluid pressure acting thereon at said outlet port is in the first named predetermined ratio and being movable in response to fluid pressure at said outlet port in the other predetermined ratio relative to said first named piston means against said resilient means toward a position disengaged from said first abutment means to apply to said first named piston means the force of said resilient means, and second abutment means on said housing for engagement with said other piston means to limit the relative movement thereof, said first named piston means being responsive to fluid pressure in excess of the second predetermined value acting thereon at said inlet port to overcome the resilient means force applied thereto and actuate said valve means toward an open position blending the supplied and applied fluid pressures when said other piston means is engaged with said second abutment means.

11. A control valve according to claim 10, comprising first and second opposed effective areas on said first named piston means respectively subjected to the fluid pressures at said inlet and outlet ports, said first area being predeterminately greater than said second area, and a third effective area on said other piston means subjected to the fluid pressure at said outlet port, said third area being additive to said second area when said other piston means is engaged with said first abutment means and being responsive to the fluid pressure at said outlet port in the other predetermined ratio to urge said other piston means toward its position disengaged from said first abutment means.

12. A control valve according to claim 10, comprising other resilient means engaged between said housing and said first named piston means, said first named piston means being responsive to the force exerted thereon of said other resilient means to actuate said valve means toward its open position blending the supplied and applied fluid pressures until the magnitudes thereof attain a third predetermined value predeterminately less than the first named predetermined value.

13. A control valve comprising a housing having an inlet and an outlet therein, a differential piston movable in said housing having a larger surface presented to said inlet and a smaller surface presented to said outlet, a passage through said differential piston communicating said inlet and outlet, a valve positioned to control said passage, another piston concentrically arranged with said differential piston for concerted and relative movement therewith in said housing, an abutment on said differential piston for engagement with said other piston, a spring connected in caged relation between said differential and other pistons urging said other piston toward engagement with said abutment for concerted movement with said differential piston, said differential piston being movable to a passage opening position concertedly with said other piston in response to fluid pressure delivered to said inlet between first and second predetermined values to establish a reduced fluid pressure at said outlet in a first predetermined ratio and also being movable to its passage opening position relative to said other piston in response to fluid pressure delivered to said inlet in excess of the second predetermined value and less than a third predetermined value to establish the reduced fluid pressure at said outlet in a second predetermined ratio, another surface on said other piston presented only to said outlet and additive to said smaller surface when said other piston is engaged with said abutment, the fluid pressure at said outlet in the second predetermined ratio acting on said other surface to urge said other piston from engagement with said abutment against said spring to exert the force thereof against said differential piston upon its movement relative to said other piston.

14. A control valve according to claim 13, comprising another spring engaged with said differential piston and urging said differential piston toward its passage opening position to blend the fluid pressure at said outlet with that delivered to said inlet when the magnitude of the first predetermined value is greater than zero.

15. A control valve according to claim 13, comprising another abutment on said housing for engagement with said other piston to limit the movement thereof in response to the fluid pressure at said outlet in the second predetermined ratio acting on said other surface, said differential piston being movable to its passage opening position against the force of said spring in response to fluid pressure delivered to said inlet in excess of the third predetermined value to thereafter blend the fluid pressures at said inlet and outlet when said other piston is engaged with said other abutment.

16. A control valve having a housing for providing fluid communication between an inlet port, an outlet port and an exhaust port therein, and having control elements within said housing for effecting control over said fluid communication, comprising:

proportioning valve means movable in said housing between said inlet and outlet ports for performing proportioning operations on fluid pressure supplied thereto, said proportioning valve means including an input area to be subjected to said fluid pressure at the inlet port for establishing an input force to act on said proportioning valve.

said proportioning valve means further including an output area less than said input area and opposed thereto to be subjected to fluid pressure at the outlet port for establishing an output force to act on said proportioning valve;

resiliently urged means movably mounted in said housing and concentrically mounted about an outer peripheral surface of said proportioning means and providing an output area to be subjected to fluid pressure at the outlet port for establishing an additive output force with said output force established by said pressure acting on said proportioning valve output area, said resiliently urged means output area and said proportioning valve output area being concertedly greater than said proportioning valve input area; and abutment means on said housing for engagement with said resiliently urged means to limit the movement thereof.

* * * * *